(12) United States Patent
Zimmerman et al.

(10) Patent No.: US 10,562,056 B2
(45) Date of Patent: Feb. 18, 2020

(54) SCRUBBER FILTER ASSEMBLY FOR CONTROL VALVE ON A WATER SUPPLY PIPE IN AN IRRIGATION SYSTEM

(71) Applicant: Nelson Irrigation Corporation, Walla Walla, WA (US)

(72) Inventors: Mathew Zimmerman, Walla Walla, WA (US); Craig Nelson, Walla Walla, WA (US); Joseph Daniel Sinden, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 194 days.

(21) Appl. No.: 15/847,556

(22) Filed: Dec. 19, 2017

(65) Prior Publication Data

US 2019/0184416 A1  Jun. 20, 2019

(51) Int. Cl.
*B05B 15/40* (2018.01)
*A01G 25/16* (2006.01)

(52) U.S. Cl.
CPC .............. *B05B 15/40* (2018.02); *A01G 25/16* (2013.01)

(58) Field of Classification Search
None
See application file for complete search history.

(56) References Cited

U.S. PATENT DOCUMENTS

| | | | | |
|---|---|---|---|---|
| 2,689,020 A | * | 9/1954 | Hersey, Jr. | B01D 46/0071 55/291 |
| 3,971,642 A | * | 7/1976 | Perez | B01D 47/06 96/250 |
| 4,081,171 A | * | 3/1978 | Morgan | B01D 35/04 137/549 |
| 5,996,608 A | * | 12/1999 | Hunter | F16K 31/402 137/244 |
| 6,575,307 B2 | * | 6/2003 | Lockwood | B01D 29/114 210/413 |
| 7,665,713 B1 | * | 2/2010 | Clark | F16K 7/075 251/4 |
| 10,274,098 B2 | * | 4/2019 | Lodolo | F16K 31/385 |
| 2002/0040868 A1 | * | 4/2002 | Lockwood | B01D 29/114 210/106 |

(Continued)

OTHER PUBLICATIONS

Nelson 800 Series Control Valve Selection Guide, 8 pages (2016).
Rain Bird Tech. Spec. PEB and PESB Series Valves (Apr. 2016).
Nelson 1000 Series Control Valves, 8 pages (Dec. 2016).

*Primary Examiner* — Chester T Barry
(74) *Attorney, Agent, or Firm* — Nixon & Vanderhye P.C.

(57) ABSTRACT

A scrubber filter assembly including: a shaft mounted in an interior passage of a housing and configured to reciprocally move within the housing; a water outlet coupling on a side of the shaft which extends through a slot in the housing wherein the outlet coupling moves reciprocally within the slot as the shaft moves reciprocally, an inlet at a distal end of the shaft and the inlet extends into a water passage within the collar, wherein the inlet includes an outer surface having a filter configured to allow water to enter the inlet and prevent debris entering the water passage; and an edge extending around the perimeter of the outer surface of the inlet, wherein the edge is fixed to the collar, and the edge is configured to scrape debris from the filter as the inlet moves reciprocally with the shaft.

16 Claims, 5 Drawing Sheets

(56) References Cited

U.S. PATENT DOCUMENTS

| | | | |
|---|---|---|---|
| 2007/0295674 A1* | 12/2007 | Kirker | B01D 63/02 |
| | | | 210/785 |
| 2008/0029722 A1* | 2/2008 | Irwin | F16K 31/402 |
| | | | 251/45 |
| 2010/0116754 A1* | 5/2010 | Lockwood | G05D 16/0663 |
| | | | 210/741 |
| 2013/0008542 A1* | 1/2013 | Irwin | F16K 31/402 |
| | | | 137/859 |
| 2016/0375380 A1* | 12/2016 | Tiwari | B01D 29/118 |
| | | | 210/355 |

* cited by examiner

SCRUBBER FILTER ASSEMBLY FOR CONTROL VALVE ON A WATER SUPPLY PIPE IN AN IRRIGATION SYSTEM

BACKGROUND OF INVENTION

The invention relates to hydraulically actuated control valves used to regulate water flow through water supply pipes in irrigation systems. The invention particularly relates to filters on water inlets used to extract water from the water supply pipes for use in hydraulically actuating the control valves.

Supply pipes convey water from a water source, such as a pond or well, to sprinklers, nozzles and water guns arranged along the length of the supply pipe. The supply pipes may have diameters of six to ten inches (152 to 254 millimeters) and a length of as much as a quarter to half a mile (400 to 800 meters) for center pivot irrigation systems.

Water flow through the supply pipes is turned on and off by control valves in the supply pipes. The control valves may also regulate the water pressure in the supply pipes. Control valves may be placed regularly along the length of a supply pipe to control water flow at different locations along the supply pipe and to ensure that the water pressure along the supply pipe is relatively uniform.

The control valves are actuated hydraulically using water extracted from the supply pipe to which the control valves are attached. A difficulty with water in the supply pipe is it has dirt, sand, grasses, starch and other debris (collectively, debris) that comes with the water when pumped into the supply pipe from the water's source. The water source may be drainage ditches in an agricultural field, ponds, streams, wells and other generally dirty sources of water.

Debris can interfere with the operation of the control valve. Specifically, the debris may clog the narrow passages in hydraulic hoses, control solenoid (pressure regulator) and other components that provide hydraulic control of the control valve. To avoid interfering with the operation of the control valve, water extracted from the supply pipe is filtered before flowing into the narrow passages of the hydraulic control system. The filtering of the water results in debris collecting on the outer surface of the filter.

To clean the filter, it is conventional to remove the filter from the control valve. Removal of the filter is time consuming and expensive in that it requires service personnel to travel to the water supply pipe and remove and clean the filter. There is a long-felt need for techniques that reduce the cost and effort needed to maintain an irrigation system.

SUMMARY OF THE INVENTION

The present invention provides a means to clean the filter on an inlet of a filter assembly that may operate automatically or may be manually operated without need to remove the filter from the water supply pipe.

An embodiment of the invention is a scrubber filter assembly configured to be mounted with a control valve in a water supply pipe for an irrigation system, the scrubber filter assembly comprising: a collar which is integral with or configured to be mounted to an end of the control valve; an outer housing mounted to the collar and extending radially outward from the collar, wherein the outer housing has an interior passage and a slot that is aligned with the interior passage; a shaft mounted in the interior passage of the outer housing and configured to reciprocally move within the interior passage; an outlet coupling mounted on a side of the shaft which extends through the slot, and the outlet coupling is open to a water passage extending through the shaft from an inlet at a distal end of the shaft, and wherein the inlet extends into a water passage within the collar, and includes an outer surface having a filter configured to allow water to enter the inlet and prevent debris from entering the water passage; and an edge extending around the perimeter of the outer surface of the inlet, wherein the edge is fixed to the collar, and the edge is configured to scrape debris from the filter as the inlet moves reciprocally with the shaft.

The outer housing may include a chamber coupled to a source of pressurized water and a piston in the chamber which is moved in the chamber by water pressure, wherein the piston is connected to a proximal end of the shaft.

The inlet may be a cylinder having a closed end and another end coupled to the shaft.

The edge may be at a distal end of a cage and a proximal end of the cage is attached to an inside surface of the collar. The cage may have legs supporting semi-circular portions of the edge, and the scrubber filter assembly further comprises an O-ring mounted to the legs and biasing the legs and semi-circular portions inward to one another.

Another embodiment of the invention may a scrubber filter assembly comprising: a hollow outer housing having one end configured to be fixed to a water supply pipe and an opposite end including or connected to a pressure chamber; a piston within the pressure chamber; a shaft reciprocally mounted in the hollow outer housing having an end coupled to the piston and an opposite end connected to and fixed to a water inlet, wherein the inlet is configured to extend into a water passage in the water supply pipe; a water outlet fixed to a side of the shaft and extending through a slot in the hollow outer housing; and a cage mounted to an inner surface of the water supply pipe and extending into the water passage, wherein the inlet extends through the cage and the cage has an edge which scrapes against an outer surface of the inlet as the inlet is extended and retracted.

The edge of the cage may be annular with a slot extending through the edge. The cage may include legs each supporting the edge, and the scrubber filter assembly may further include an O-ring mounted to and encircling the legs, wherein the O-rings bias the legs radially inward and thereby bias the edge radially inward.

The outer surface of the inlet may include at least one of slots, openings and pores on the outer surface of the inlet.

The scrubber filter assembly may include a collar configured to be mounted between an end of the water supply pipe and a control valve, wherein the hollow outer housing is configured to be mounted to an outer surface of the collar and the cage is configured to be mounted to an inner surface of the collar.

In another embodiment, the scrubber filter assembly may include: a housing configured to be fixed to a collar; a shaft mounted in an interior passage of the housing and configured to move reciprocally therein; a water outlet coupling mounted to a side of the shaft which extends through a slot in the housing wherein the outlet coupling moves reciprocally within the slot as the shaft moves reciprocally, an inlet located at a distal end of the shaft that extends through the collar into a water passage, wherein the inlet includes an outer surface having a filter configured to allow water to enter the inlet and prevent debris entering the water passage; and an edge extending around the perimeter of the outer surface of the inlet, wherein the edge is fixed to the collar, and the edge is configured to scrape debris from the filter as the inlet moves reciprocally with the shaft.

The housing includes an upper region including a chamber having a piston at one end that is attached to an upper end of the shaft and an inlet to receive water under pressure, and further wherein the filter assembly includes a spring at one end of the piston which biases the piston in an upward position.

The edge may be at a distal end of the inlet which has a fixed position with respect to the collar.

The inlet may comprise a cage that includes a plurality of legs each supporting the edge, and the scrubber filter assembly may further include an O-ring mounted to and encircling the legs, wherein the O-rings bias the legs radially inward and thereby bias the edge radially inward.

The filter surface of the inlet may include at least one of slots, openings and pores on the outer surface of the inlet.

The collar may be configured to be mounted between an end of a water supply pipe and a control valve, wherein the hollow outer housing is configured to be mounted to an outer surface of the collar and the inlet is configured to be mounted to an inner surface of the collar.

DETAILED DESCRIPTION OF THE INVENTION

Figure 1:
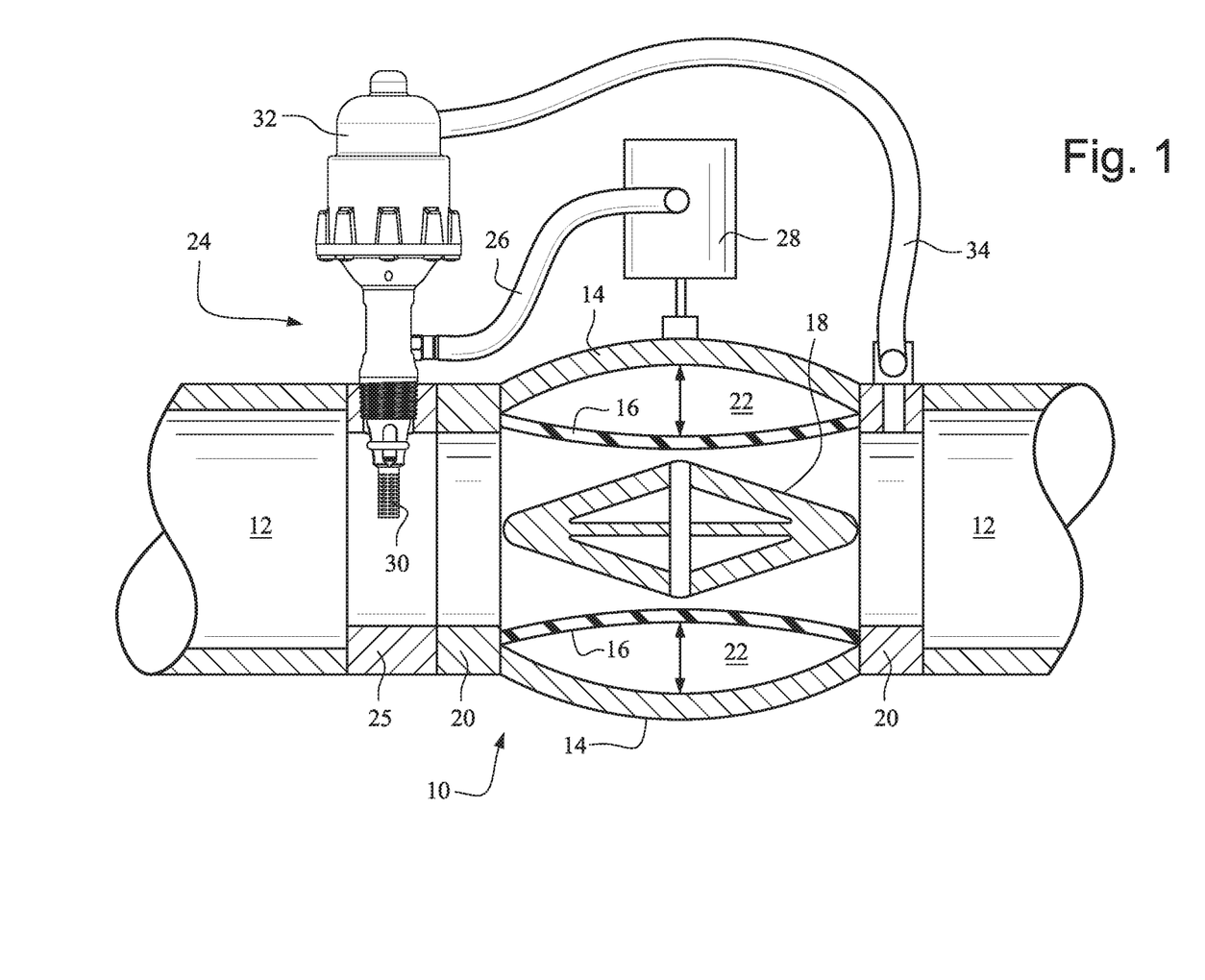
FIG. 1 is a side view showing a cross section of a water supply pipe with a control valve and a scrubber filter assembly.

FIG. 1 shows in cross section a control valve 10 in a water supply pipe 12 for an irrigation system. The control valve 10 may be a conventional device such as an 800 or 1000 Series Control Valve™ sold by the Nelson Irrigation Corporation of Walla Walla, Wash., USA. The control valve 10 includes a housing 14 which is generally circular in cross section, a deformable sleeve 16 within the housing, and a cage 18 in a flow passage within the housing. The sleeve forms an outer wall of the flow passage through the control valve. Opposite ends the sleeve 16 are attached to end collar portions 20 of the housing 14. The middle of the sleeve deforms towards and away from the cage 18, as indicated by the double arrow. By deforming inward towards the cage, the sleeve restricts and ultimately closes water flow through the control valve. By deforming outward, the sleeve opens the control valve to allow water to flow through the supply pipe.

The sleeve 16 is hydraulically deformed by water pressure in an annular chamber 22 between an outer wall of the housing and the sleeve. Adding water to the chamber causes the sleeve to deform. To open the control valve or reduce the backpressure caused by the control valve on water flowing through the supply pipe, water is drained from the chamber 22 which causes the sleeve to deform away from the cage and thereby increase the area of the flow passage through the control valve.

Water flows into the chamber 22 from a scrubber filter assembly 24 that diverts a small portion of the water flowing through the supply pipe into a hydraulic hose 26, through a solenoid 28, pressure regulator or another controller, and into the chamber 22. The solenoid 28 or other controller may function as an on-off valve for the control valve or a pressure regulator that controls the flow of water in or out of the chamber 22 and thus the amount of deflection of the sleeve 16 in the control valve.

The scrubber filter assembly 24 may be integral with or an accessory component to the control valve 10. The scrubber filter assembly may be placed upstream of the control valve or, if integral with the control valve, upstream of the sleeve 16 in the control valve. The scrubber filter assembly may be mounted to a collar 25 sandwiched between an end of the supply pipe 12 and an end of a collar 20 of the control valve.

An inlet 30 of the scrubber filter assembly extends into the water flow through the supply pipe. Water from the supply pipe enters the inlet and is directed by the scrubber filter assembly to the hose 26, solenoid 28 and other hydraulic passages of the control valve.

The scrubber filter assembly 24 filters water extracted from the water supply pipe before the water flows into the passages of the hydraulic control of the control valve. A filter 31 (FIG. 2) is on or at the outer surface of the inlet 30. The filter 31 may be narrow slots or holes in the wall of a cylinder forming the inlet. The filter 31 may also be a screen or mesh or porous sleeve on the outer surface of the inlet. The positions, sizes and shapes of the slots, holes, mesh or sleeve are configured to allow water to flow into the inlet and prevent debris from entering the inlet.

Figure 2:
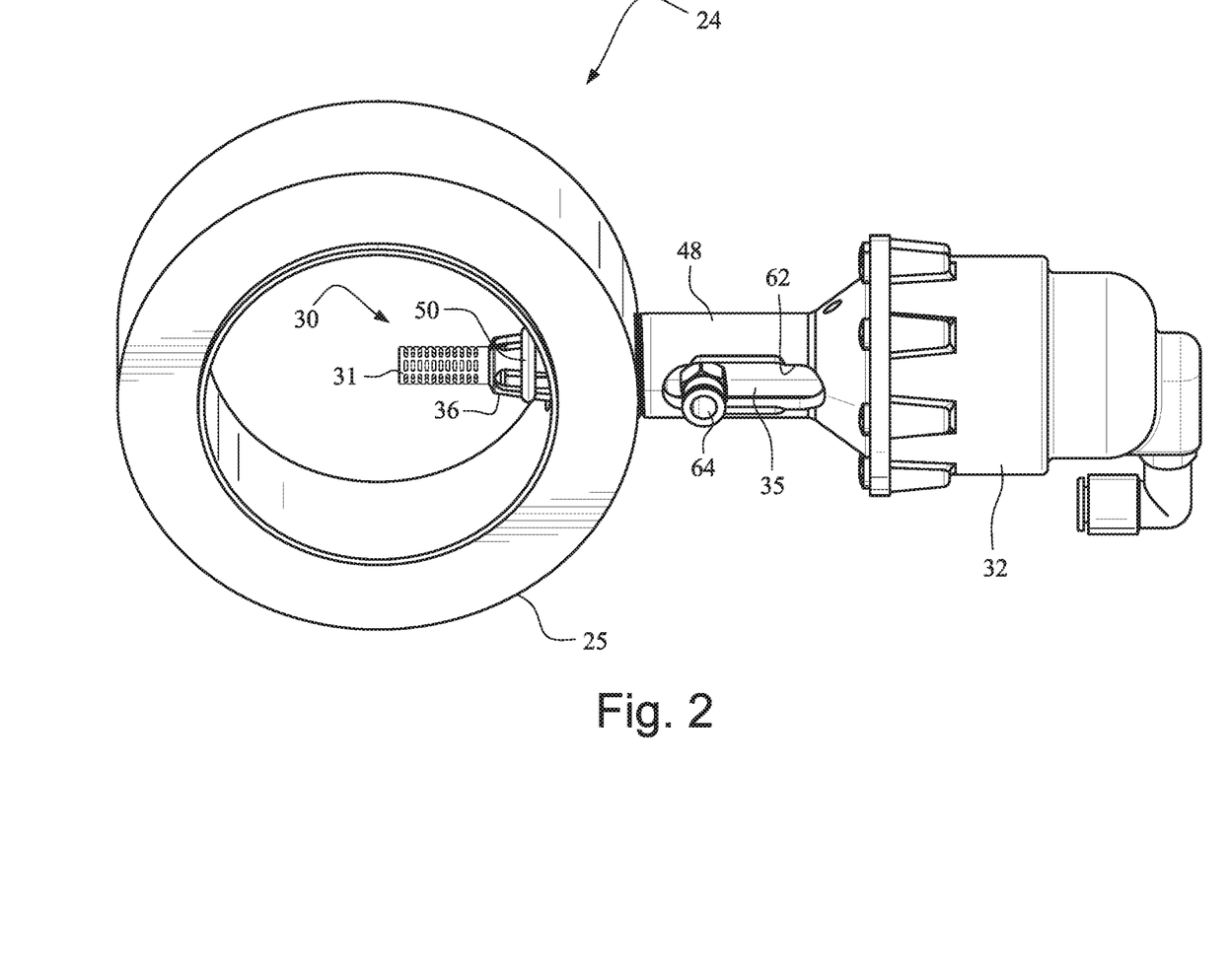
FIG. 2 is a side view of a scrubber filter assembly mounted to a collar with the inlet deployed into a water supply pipe.

Debris tends to collect on the outside surface of the inlet due to the filtering function performed at the inlet 30. The collected debris will, if allowed to accumulate over a period of weeks or months, form a mat covering the outer surface of the inlet 30. If the debris is not periodically cleaned from the surface of the inlet 30, water will not flow into and through the inlet 30 at sufficient pressure to provide proper hydraulic control of the control valve. An obstructed inlet may prevent the control valve from fully closing and thereby allow water leakage through the control valve while the valve is intended to be closed. The problems associated with an obstructed inlet are prevented or at least reduced by the self-cleaning function of the scrubber filter assembly. Also, the self-cleaning function allows the period to be increased between removing of the scrubber filter assembly from the supply pipe for maintenance and cleaning.

Figure 3:
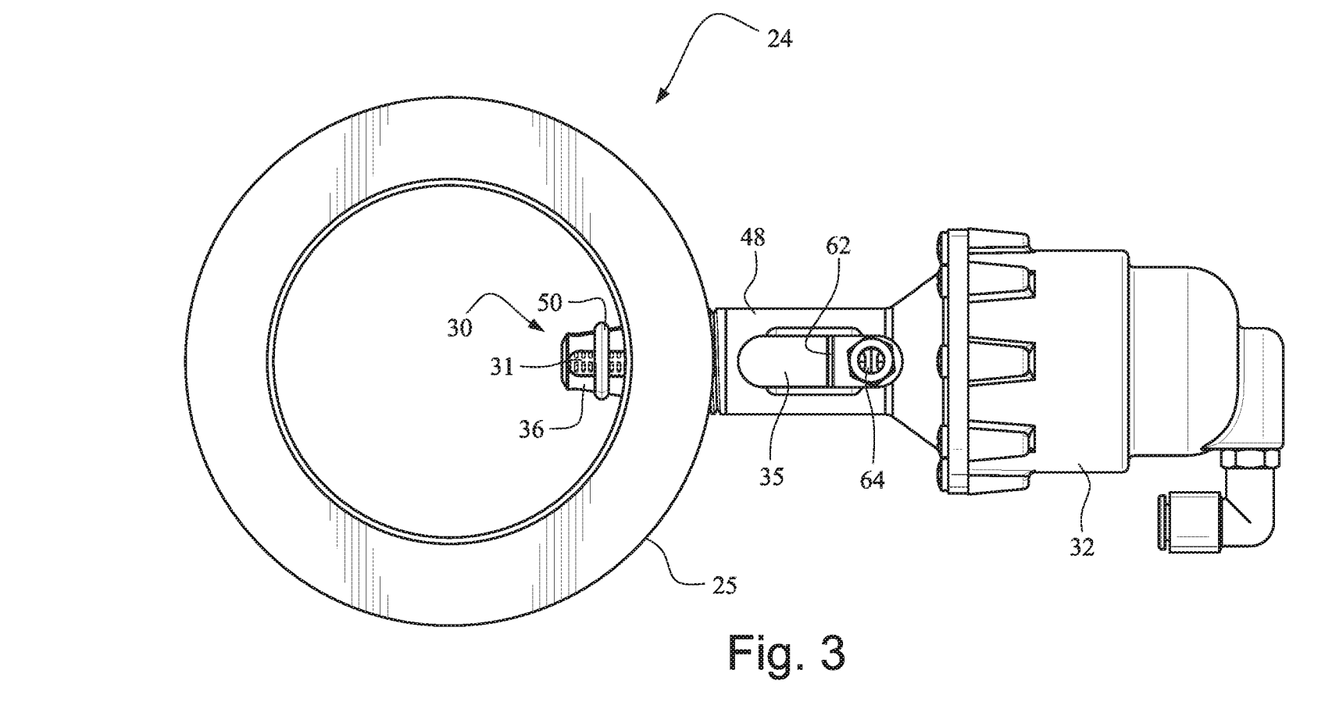
FIG. 3 is a side view of a scrubber filter assembly mounted to a collar with the inlet retracted into the collar.
Figure 4:
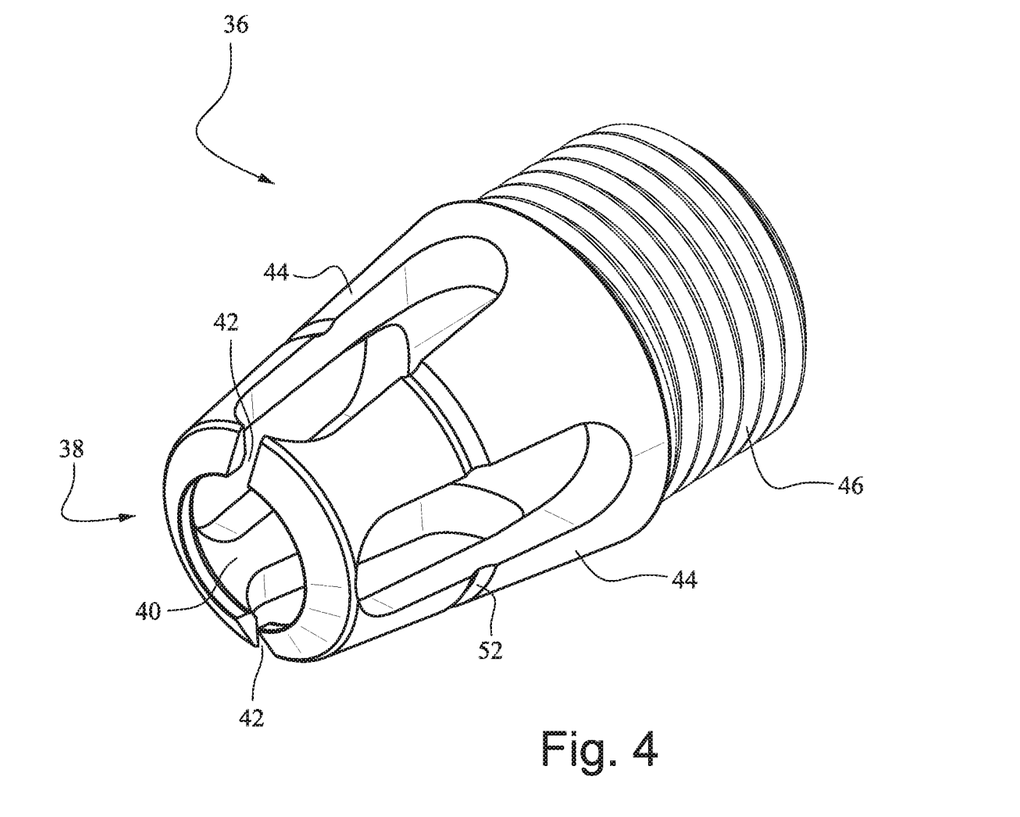
FIG. 4 is a perspective view of a cage for the inlet of the scrubber filter assembly.

The self-cleaning function of the inlet 30 (FIG. 3) is evident by inspection of FIG. 4 and is achieved by scraping debris from the outer surface of the inlet 30 by sliding across the outer surface of an edge 40 at an annular end 38 of a cage 36 having a fixed position with respect to the inlet 30. The edge 40 may be a cylindrical surface parallel to the filter, an annular element having a triangular cross section, a deformable ring or wiper blade mounted to a metal surface at the annular end 38 or some other device configured to scrape debris off the outer surface of the inlet 30. By sliding the annular edge 38 across the outer surface of the inlet 30, debris collected on the outside of the inlet is removed and allowed to reenter the water flowing through the supply pipe.

Figure 5:
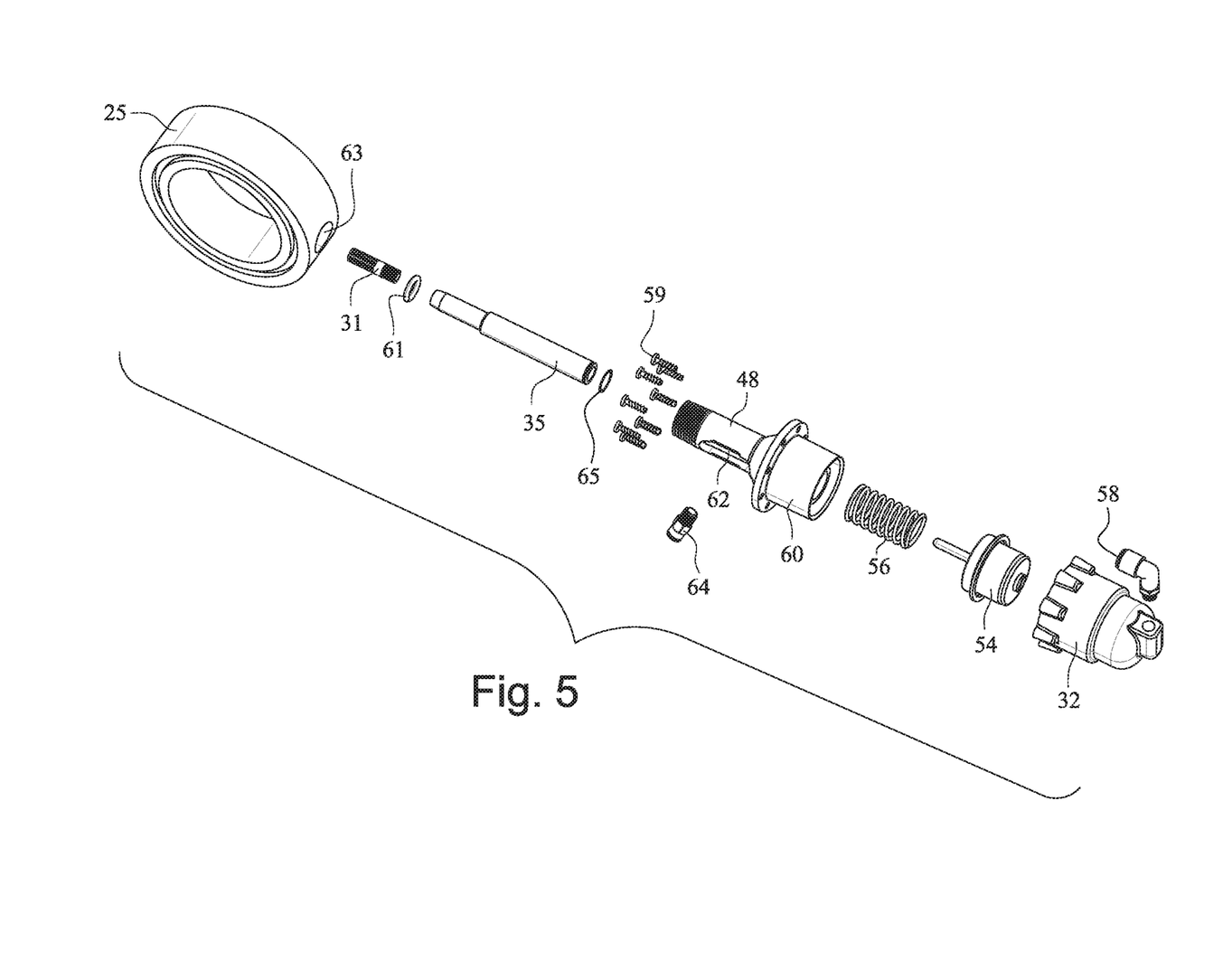
FIG. 5 is an exploded view of the scrubber filter assembly and collar.

The scrubber filter assembly 24 (FIG. 1) may include a hydraulic chamber located within an outer housing 32 (FIG. 5) and a cup 60 (FIG. 5). The hydraulic chamber receives water via a hose 34 from, for example, the supply pipe 12 downstream of the control valve 10. As the water pressure falls downstream of the control valve, the pressure drops in the hydraulic chamber, within the outer housing 32. The drop in pressure in the hydraulic chamber results in a spring 56 pushing a piston 54 (FIG. 5) upwards into the chamber. As the piston moves upward, the filter 31 is retracted from the supply pipe. Similarly, as the water pressure increases downstream of the control valve, the chamber is pressurized which extends the filter 31 into the water flowing through the supply pipe.

FIGS. 2 and 3 are side views of the scrubber filter assembly 24 and its collar 25 showing the inlet 30 in retracted (FIG. 2) and extended (FIG. 3) positions. The inlet 30 may be a cylinder mounted to the end of a hollow shaft 35 that extends through a lower portion of the scrubber filter assembly 24. The outer surface of the inlet 30 is porous, wherein the porosity may be formed by holes, slots or irregular opening. The inlet may be a form of metal, such as a corrosion resistant stainless steel. The porous outer surface of the inlet houses an inner water passage that extends up through a center of the inlet and into a hollow inner passage of the shaft 35.

The inlet 30, when retracted (FIG. 3), is housed in a cage 36 that is mounted to the end of the shaft 35 or to an inside surface of the collar 25. As shown in FIG. 4, the cage 36 has an inner opening sized to receive the inlet 30. The distal end of the cage 36 has a generally annular end 38 having an inner edge 40 that is generally circular and is adjacent the outer surface of the inlet. The annular end 38 may be split such that a gap 42 is between opposite semi-circular portions of the annular end. The gap in the annular end allows for a small degree of flexing or other deformation of the inner edge 40 of the annular end and the inner edge 40 slides over the outer surface of the inlet 30.

Each of the semi-circular portions are supported by one or more legs 44 of the cage. The legs 44 are arranged into a generally cylindrical or frustoconical shape so that at one end is the annular end 38 and at the opposite end is a cylindrical portion 46 with threads to engage a threaded opening on an inner surface of the collar 25. Alternatively, the cage 36 may be mounted directly to an outer or cylindrical housing 48 (FIG. 2) of the scrubber filter assembly 24.

To bias the inner edge 40 radially inward towards the filter, an elastic O-ring 50 (FIG. 5) is applied to the cage. The O-ring sits in grooves 52 on the outer surface of legs 44 of the cage. The O-ring is in tension when mounted on the grooves. The tension in the O-ring results in a radially inward force applied by the O-ring to the legs. This radially inward force pushes (biases) the legs 44 towards each other and thus deflects the semi-circular segments of the edge 40 slightly towards the outer surface of the filter 31. The deflection towards the outer surface assists in scraping debris from the outer surface of the filter 31.

To scrape debris from the outer surface of the filter 31, the filter is extended or retracted past the edges of the annular end 38 of the cage 36. The retraction and extension of the filter follows the movement of a piston 54 (FIG. 5) within the hydraulic chamber in the outer housing 32. The piston 54 moves in response to hydraulic pressure in the chamber that houses the piston. The piston 54 is connected to the upper end of the shaft 35 while the lower end of the shaft is connected to the inlet 30. As the piston moves up and down in the chamber, the shaft 35 and inlet 30 move such that the inlet is extended into the water passage of the supply pipe 12 and retracted from the supply pipe.

Referring to FIG. 5, the piston 54 is biased upwards in the hydraulic chamber by a spring 56. The upward bias on the piston causes the inlet 30 to be biased in a retracted position. Water pressure within the chamber overcomes the force of the spring 56 and causes the piston 54, shaft 35 and inlet 30 to move down into the extended position.

The spring 56 and piston 54 are seated in a cup 60 that forms the bottom of the hydraulic chamber. The outer housing 32 forms the upper portion of the chamber and may be fastened to the cup 60 by screws 59 or other fasteners. A water fitting 58 fastened to the outer housing 32 receives water under pressure that pressurizes the chamber and hydraulically pushes the piston 54 down in the chamber. The source of the water applied to the water fitting 58 may be a control solenoid, pressure regulator or water extracted from the supply pipe and flowing through hose 34. In addition or alternatively, a manual control valve or lever may be used to manually retract and extend the filter 31 to clear debris from the filter 31.

A lower end of the cylindrical housing has threads to engage a threaded opening 63 in the collar 25. An O-ring 61 provides a water-tight seal between the shaft 35 and the opening 63 in the collar that receives the cylindrical housing 48. A retaining ring 65 assists in securing the shaft 35 in the end of the cylindrical housing 48.

The cylindrical housing 48 encircles the shaft 35 that extends between the inlet 30 and piston 54. A slot 62 is formed in the cylindrical housing 48. A water outlet coupling 64 extends from the shaft 35 through the slot 62. The water outlet coupling 64 allows water that flows through the inlet 30 and the shaft 35 to flow to a hose 34 (FIG. 1). The water outlet coupling 64 is fixed to the side of the shaft 35 and moves with the shaft as the filter 31 and inlet 30 are extended and retracted. The slot 62 in the housing 48 is sufficiently long to allow the outlet coupling to move with the shaft.

The shaft 35 has an internal water passage extending from the inlet 30 to the outlet 64. Water flows from the water supply pipe 12, into the inlet, through the internal passage in the shaft 35 and is discharged from the outlet 64. The movement of the outlet up and down due to the movement of the shaft 35 is accommodated by the flexibility of the hose 26 (FIG. 1) attached to the outlet.

There need be no moving parts forming the internal passage in the shaft 35 and thus no need for complicated seals associated with the internal passage. Avoiding complicated seals and moving parts for the internal water passage through the shaft 35 is advantageous in that it reduces the complexity of the scrubber filter assembly by avoiding the need for a movable seal in the water passage from the inlet 30, the shaft 35 and the outlet 64. Another advantage is that the internal passage is not prone to malfunction or leak in part due to the lack of moving parts and seals in the internal passage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

We claim:

1. A scrubber filter assembly configured to be mounted with a control valve in a water supply pipe for an irrigation system, the scrubber filter assembly comprising:
   a collar which is integral with or configured to be mounted to an end of the control valve;

an outer housing mounted to the collar and extending radially outward from the collar, wherein the outer housing has an interior passage and a slot that is aligned with the interior passage;

a shaft mounted in the interior passage of the outer housing and configured to reciprocally move within the interior passage;

an outlet coupling mounted on a side of the shaft which extends through the slot, and the outlet coupling is open to a water passage extending through the shaft from an inlet at a distal end of the shaft, and wherein the inlet extends into a water passage within the collar, and includes an outer surface having a filter configured to allow water to enter the inlet and prevent debris from entering the water passage; and an edge extending around the perimeter of the outer surface of the inlet, wherein the edge is fixed to the collar, and the edge is configured to scrape debris from the filter as the inlet moves reciprocally with the shaft.

2. The scrubber filter assembly of claim 1 wherein the outer housing includes a chamber coupled to a source of pressurized water and a piston in the chamber which is moved in the chamber by water pressure, wherein the piston is connected to a proximal end of the shaft.

3. The scrubber filter assembly of claim 1 wherein the inlet is a cylinder having a closed end and another end coupled to the shaft.

4. The scrubber filter assembly of claim 1 wherein the edge is at a distal end of a cage and a proximal end of the cage is attached to an inside surface of the collar.

5. The scrubber filter assembly of claim 4 wherein the cage has legs supporting semi-circular portions of the edge, and the scrubber filter assembly further comprises an O-ring mounted to the legs and biasing the legs and semi-circular portions inward to one another.

6. A scrubber filter assembly comprising:
a hollow outer housing having one end configured to be fixed to a water supply pipe and an opposite end including or connected to a pressure chamber;
a piston within the pressure chamber;
a shaft reciprocally mounted in the hollow outer housing having an end coupled to the piston and an opposite end connected to and fixed to a water inlet, wherein the inlet is configured to extend into a water passage in the water supply pipe;
a water outlet fixed to a side of the shaft and extending through a slot in the hollow outer housing; and
a cage mounted to an inner surface of the water supply pipe and extending into the water passage, wherein the inlet extends through the cage and the cage has an edge which scrapes against an outer surface of the inlet as the inlet is extended and retracted.

7. The scrubber filter assembly of claim 6 wherein the edge of the cage is annular with a slot extending through the edge.

8. The scrubber filter assembly of claim 6 wherein the cage includes legs each supporting the edge, and the scrubber filter assembly further includes an O-ring mounted to and encircling the legs, wherein the O-rings bias the legs radially inward and thereby bias the edge radially inward.

9. The scrubber filter assembly of claim 6 wherein the outer surface of the inlet includes at least one of slots, openings and pores on the outer surface of the inlet.

10. The scrubber filter assembly of claim 6 further comprising a collar configured to be mounted between an end of the water supply pipe and a control valve, wherein the hollow outer housing is configured to be mounted to an outer surface of the collar and the cage is configured to be mounted to an inner surface of the collar.

11. A scrubber filter assembly including:
a housing configured to be fixed to a collar;
a shaft mounted in an interior passage of the housing and configured to move reciprocally with respect to the housing;
a water outlet coupling mounted to a side of the shaft which extends through a slot in the housing wherein the outlet coupling moves reciprocally within the slot as the shaft moves reciprocally,
an inlet located at a distal end of the shaft that extends through the collar into a water passage, wherein the inlet includes an outer surface having a filter configured to allow water to enter the inlet and prevent debris entering the water passage; and
an edge extending around the perimeter of the outer surface of the inlet, wherein the edge is fixed to the collar, and the edge is configured to scrape debris from the filter as the inlet moves reciprocally with the shaft.

12. The scrubber filter assembly of claim 11 wherein the housing includes an upper region including a chamber, and
the scrubber filter assembly further comprises a piston in the chamber and configured to move reciprocally within the chamber, wherein one end of the piston is attached to the shaft, and
a spring adjacent the piston which biases the piston towards an upper region of the chamber.

13. The scrubber filter assembly of claim 11 wherein the edge is at a distal end of the inlet which has a fixed position with respect to the collar.

14. The scrubber filter assembly of claim 13 wherein the inlet comprises a cage that includes a plurality of legs each supporting the edge, and
the scrubber filter assembly further includes an O-ring mounted to and encircling the legs, wherein the O-rings bias the legs radially inward and thereby bias the edge radially inward.

15. The scrubber filter assembly of claim 11 wherein the filter surface of the inlet includes at least one of slots, openings and pores on the outer surface of the inlet.

16. The scrubber filter assembly of claim 11 wherein the collar is configured to be mounted between an end of a water supply pipe and a control valve, wherein the hollow outer housing is configured to be mounted to an outer surface of the collar and the inlet is configured to be mounted to an inner surface of the collar.

* * * * *